(12) United States Patent
Kritika et al.

(10) Patent No.: US 10,846,290 B2
(45) Date of Patent: Nov. 24, 2020

(54) SYSTEM AND METHOD FOR DYNAMIC QUERY SUBSTITUTION

(71) Applicant: Myntra Designs Private Limited, Bangalore (IN)

(72) Inventors: Jain Kritika, Bangalore (IN); Bajpai Nilaksh, Bangalore (IN); Batra Ankul, Bangalore (IN); Reddy Pajjuri Naveen Kumar, Bangalore (IN)

(73) Assignee: MYNTRA DESIGNS PRIVATE LIMITED, Bangalore (IN)

( * ) Notice: Subject to any disclaimer, the term of this patent is extended or adjusted under 35 U.S.C. 154(b) by 273 days.

(21) Appl. No.: 16/019,776

(22) Filed: Jun. 27, 2018

(65) Prior Publication Data
US 2019/0236186 A1 Aug. 1, 2019

(30) Foreign Application Priority Data
Jan. 30, 2018 (IN) .............................. 201841003404

(51) Int. Cl.
| | |
|---|---|
| *G06F 16/00* | (2019.01) |
| *G06F 16/2453* | (2019.01) |
| *G06F 16/2458* | (2019.01) |
| *G06F 16/901* | (2019.01) |
| *G06F 16/2457* | (2019.01) |
| *G06F 16/9536* | (2019.01) |

(Continued)

(52) U.S. Cl.
CPC .... *G06F 16/24539* (2019.01); *G06F 16/2468* (2019.01); *G06F 16/24578* (2019.01);
(Continued)

(58) Field of Classification Search
CPC ........... G06F 16/24539; G06F 16/9536; G06F 16/2468; G06F 16/9024; G06F 16/24578;
(Continued)

(56) References Cited

U.S. PATENT DOCUMENTS

2003/0217052 A1* 11/2003 Rubenczyk ........... G06F 16/951
2006/0235810 A1* 10/2006 Wen ...................... G06F 16/951
706/12

(Continued)

*Primary Examiner* — Anh Ly
(74) *Attorney, Agent, or Firm* — Harness, Dickey & Pierce, P.L.C.

(57) ABSTRACT

A system for dynamic substitution of a user query adapted for use in an online fashion platform is provided. The system includes a query retrieval module configured to retrieve the user query from the online fashion platform. The user query is provided by a user and the user query has one or more query attributes. The system also includes a session data module configured to store session data collected over a plurality of sessions on the online fashion platform. The system further includes an analytics module coupled with the session data module and the query retrieval module and is configured to analyze the user query to identify and extract a query object and one or more query attributes. The analytics module is configured to compute a popularity score for each query attribute. The popularity score is a function of the number of times an article related to the product attribute was searched. The analytics module is further configured to compute an affinity score between each query attribute and related product attributes. The affinity score between two related product attributes is a function of approximate substitution of one product attribute with another. In addition, the analytics module is configured to generate a weighted entity-affinity relationship graph (EARG) based on the popularity scores and the affinity scores. Furthermore, the system includes a query substitution module configured to generate a plurality of substitute queries sorted in order of closeness to the user query using EARG.

12 Claims, 8 Drawing Sheets

(51) Int. Cl.
*G06Q 30/02* (2012.01)
*G06F 16/95* (2019.01)

(52) U.S. Cl.
CPC ...... *G06F 16/9024* (2019.01); *G06F 16/9536* (2019.01); *G06Q 30/02* (2013.01); *G06F 16/24573* (2019.01); *G06F 16/95* (2019.01)

(58) Field of Classification Search
CPC ............... G06F 16/95; G06F 16/24573; G06F 16/2246; G06F 16/223; G06F 16/216; G06F 16/23; G06F 16/2237; G06F 17/30457; G06F 17/3053; G06F 17/30542; G06F 17/30958; G06F 17/30525; G06F 17/30861; G06F 11/3003; G06F 16/2228; G06F 6/00; G06F 16/22; G06F 11/30; G06F 16/284; G06F 16/2264; G06F 16/901; G06F 16/00; G06F 16/2455; G06F 17/30598; G06F 17/30321; G06F 17/30327; G06F 17/30477; G06Q 30/02; G06Q 30/0601
See application file for complete search history.

(56) References Cited

U.S. PATENT DOCUMENTS

| | | | |
|---|---|---|---|
| 2007/0179856 A1* | 8/2007 | O'Kelley | G06Q 30/0277 705/14.46 |
| 2007/0203908 A1* | 8/2007 | Wang | G06F 16/951 |
| 2010/0324985 A1* | 12/2010 | Kumar | G06Q 10/04 705/14.25 |
| 2013/0257872 A1* | 10/2013 | Setlur | G06F 16/44 345/440 |
| 2014/0040274 A1* | 2/2014 | Aravamudan | G06F 16/3322 707/741 |
| 2014/0046934 A1* | 2/2014 | Zhou | G06F 16/24526 707/723 |
| 2015/0324349 A1* | 11/2015 | Weiss | G06F 40/279 704/9 |
| 2016/0048879 A1* | 2/2016 | Huseyn | G06Q 30/0269 705/14.66 |
| 2016/0171534 A1* | 6/2016 | Linden | G06Q 30/0255 705/14.53 |
| 2017/0199913 A1* | 7/2017 | Azzam | G06F 16/2465 |
| 2019/0266552 A1* | 8/2019 | Gupta | G06Q 30/0639 |

\* cited by examiner

| BRANDS/SESSION | S1 | S2 | S3 | S4 | S5 | TOTAL PRODUCTS PER BRAND |
|---|---|---|---|---|---|---|
| NIKE | 10 | 2 | 0 | 8 | 5 | 25 |
| PUMA | 20 | 3 | 8 | 2 | 4 | 37 |
| ADIDAS | 10 | 5 | 2 | 2 | 1 | 20 |
| FOREVER21 | 2 | 0 | 1 | 6 | 0 | 9 |
| ZARA | 6 | 0 | 1 | 0 | 8 | 15 |
| ALLEN SOLLY | 0 | 0 | 0 | 0 | 0 | 0 |
| TOTAL PRODUCTS PER SESSION | 48 | 10 | 12 | 18 | 18 | 106 |

FIG. 3-A

| BRANDS ($B_i$) | Affinity $B_i \rightarrow$ Nike |
|---|---|
| PUMA | 0.6 |
| ADIDAS | 0.5 |
| FOREVER21 | 0.16 |
| ZARA | 0.375 |
| ALLEN SOLLY | 0 |

FIG. 3-B

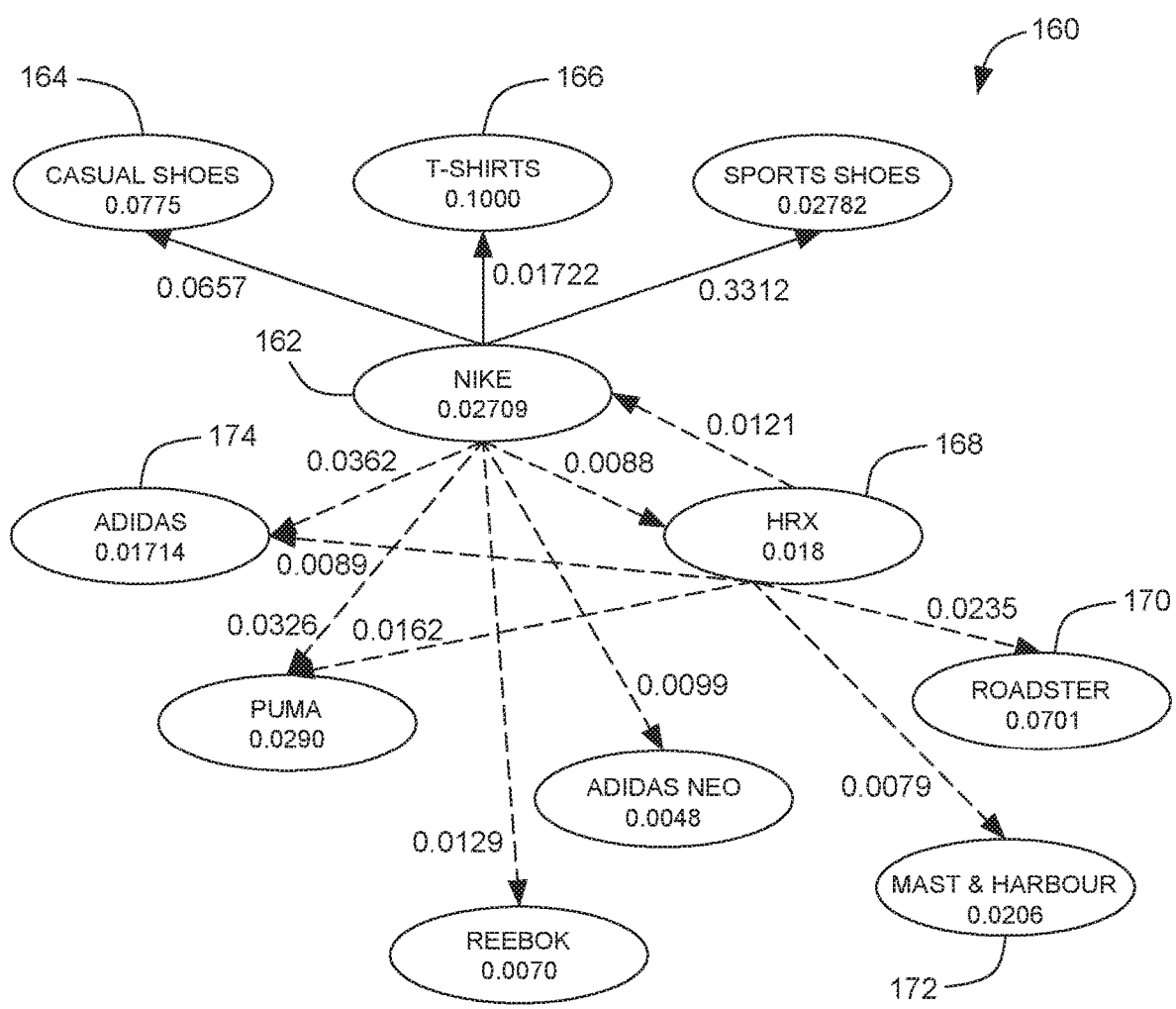
FIG. 6-A

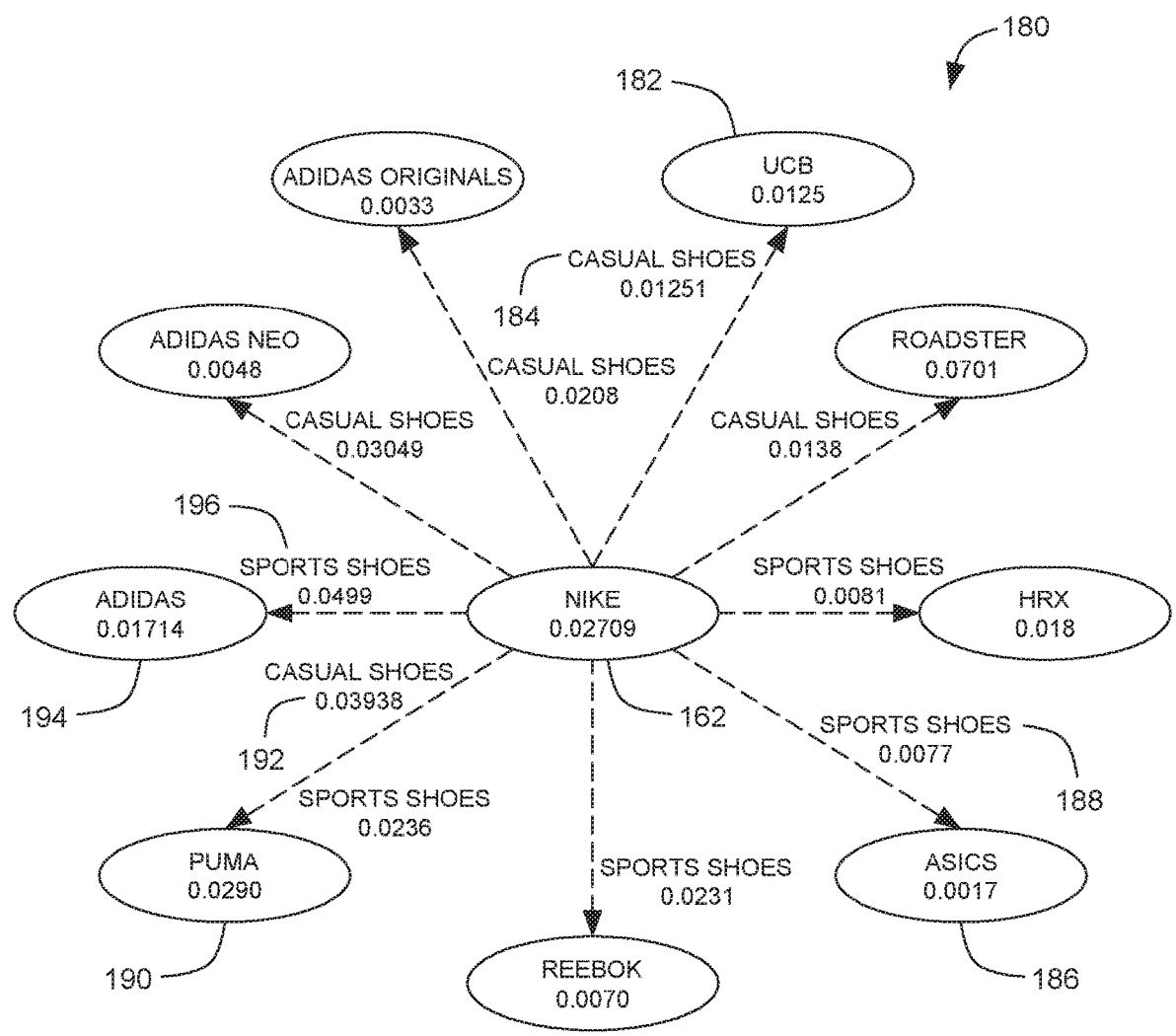
FIG. 6-B

SYSTEM AND METHOD FOR DYNAMIC QUERY SUBSTITUTION

PRIORITY STATEMENT

The present application claims priority under 35 U.S.C. § 119 to Indian patent application number 201841003404 filed 30 Jan. 2018, the entire contents of which are hereby incorporated herein by reference.

FIELD

Embodiments of the invention relate generally to e-commerce platforms and more particularly to a system and method for dynamic query transformation on an e-commerce platform.

BACKGROUND

Online search is an easy and quick way for customers to discover products based on various attributes. E-commerce sites provide product search as an integral part of the product discovery experience. With advancement in search support technologies, a majority of e-commerce sites provide user-friendly experience while searching for products.

Existing e-commerce platforms support search queries which are open ended and usually constrained by underlying inventory of products available in stock. The demand and supply gap lead to sub-optimal or null query results. This may lead to bad customer experiences and thus affecting conversion rates and average order values.

Customer mindset plays an important role while searching for a product on an e-commerce site. Various factors such as human purchase behavior, varied preference for product attributes and dynamic vocabulary affect the nature of a search query. This in turn makes it complex to support queries of all nature and types.

Conventional techniques use query expansion or query substitution algorithms to address the issues of irrelevant or zero results while performing a product search on an e-commerce site. Query substitution is one of the effective ways to create more efficient queries to get closest results using content based understanding.

Another fast and effective way of handling zero result queries is query expansion. In such a method, list of attributes is sorted in order of popularity and the least popular attribute is dropped. However, such existing techniques lack context awareness and may result in loss of relevance. This in turn may affect the ability to understand user intent and behavior.

Thus, there is a need for an optimized search interface that offers a personalized and intuitive search experience to achieve high conversion rates and high average order values.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide system and method for dynamic query substitution.

Briefly, according to an example embodiment, a system for dynamic substitution of a user query adapted for use in an online fashion platform is provided. The system includes a query retrieval module configured to retrieve the user query from the online fashion platform. The user query is provided by a user and the user query has one or more query attributes. The system also includes a session data module configured to store session data collected over a plurality of sessions on the online fashion platform. The system further includes an analytics module coupled with the session data module and the query retrieval module and is configured to analyze the user query to identify and extract a query object and one or more query attributes. The analytics module is configured to compute a popularity score for each query attribute. The popularity score is a function of the number of times an article related to the attribute was clicked and searched. The analytics module is further configured to compute an affinity score between each query attribute and related product attributes. The affinity score between two related product attributes is a function of approximate substitution of one product attribute with another. In addition, the analytics module is configured to generate a weighted entity-affinity relationship graph (EARG) based on the popularity scores and the affinity scores. Furthermore, the system includes a query substitution module configured to generate a plurality of substitute queries sorted in order of closeness to the user query using EARG.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIGS. 3-A and 3-B illustrate the examples of the session data collected to determine the affinity scores and the popularity scores, implemented according to aspects of present technique;

FIGS. 6-A and 6-B are graphical representations of example embodiments of the generated entity affinity relationship graph, implemented according to the aspects of the present technique.

DETAILED DESCRIPTION OF EXAMPLE EMBODIMENTS

Figure 1:
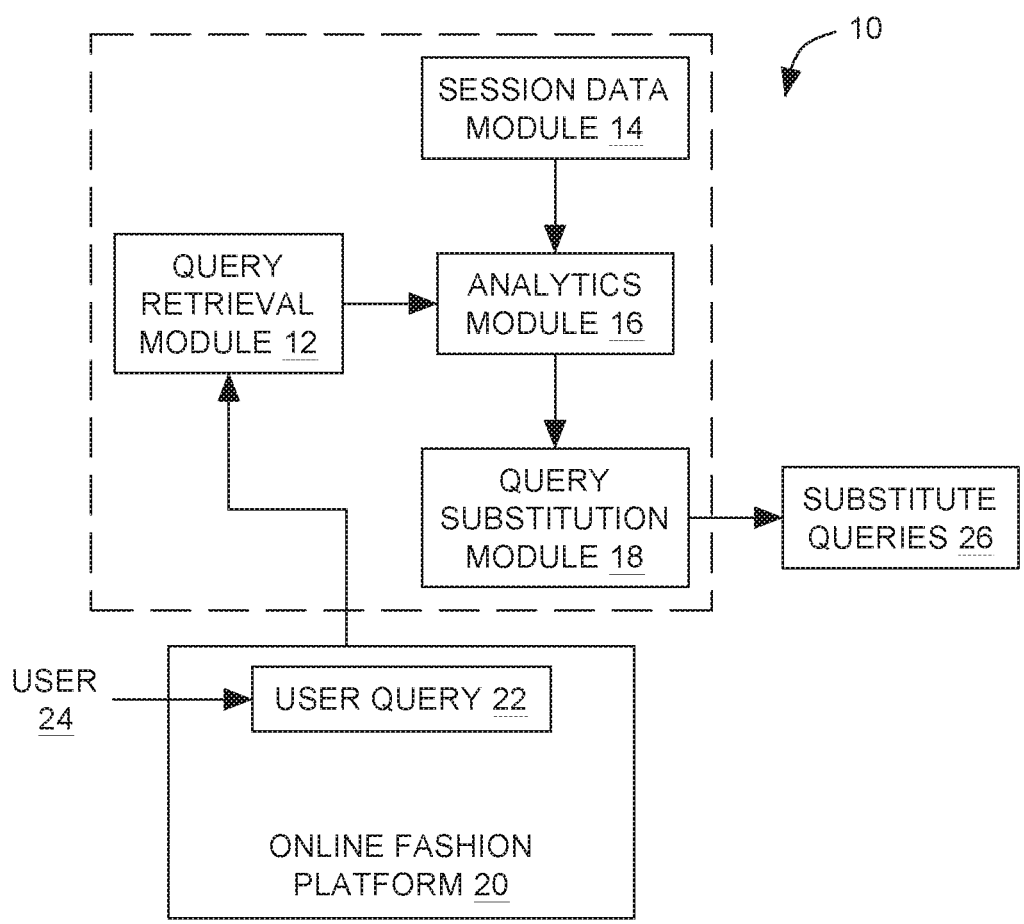
FIG. 1 is a block diagram of one embodiment of a dynamic query substitution system, implemented according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled". Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The systems described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

At least one example embodiment is generally directed to a system for dynamic substitution of a user query. Example embodiments of the present technique provide a system and method for analyzing a user query and generate a plurality of substitute queries using a dynamic query substitution system.

FIG. 1 is a block diagram of one embodiment of a dynamic query substitution system, implemented according to the aspects of the present technique. For the purpose of the specification, the dynamic query substitution system is described with respect to an online fashion platform. However, it should be understood to one skilled in the art that the dynamic query substitution system can be adapted for use on any platform that implements a search system. The system 10 includes a query retrieval module 12, a session data module 14, an analytics module 16 and a query substitution module 18. The system 10 is communicatively coupled to an online fashion platform 20 where a user query 22 is submitted by a user 24. Each component is described in further detail below.

Query retrieval module 12 is configured to retrieve a user query 22 submitted by user 24 on the online fashion platform 20. In one embodiment, the retrieved user query 22 is an annotated query and has one or more free text keywords. In general, such annotations are a finite set of tags which categorize fashion terms into types of products and attributes.

Session data module 14 is configured to store session data collected over a plurality of sessions on the online fashion platform 20. In an embodiment, the session data includes historical data collected over a plurality of sessions. Historical data may include user clicks and user views of the products present on the online fashion platform 20. In an embodiment, such an event or a session is captured for each of the one or more users of the online fashion platform. Multiple products may be explored through clicks and product views within a single session. A session may include data for a single intended purchase or for a multiple intended purchase.

In one embodiment, a session with single intended purchase includes data for similar or interrelated products having a common context. In another embodiment, for a multiple intended purchase, a session is broken down into multiple chunks. Each chunk may consist of interrelated products with the similar context. In this embodiment, multiple chunks within a session form multiple context. In another embodiment, one or more contexts with a single product are removed. In a further embodiment, the product attributes of all the clicked products are collected. The session data collected over the plurality of sessions is illustrated in example tables described in FIGS. 3-A and 3-B.

Analytics module 16 is configured to analyze the user query 22 and identify and extract a query object and one or more query attributes. In this embodiment, one or more query attributes identified from the user query are associated with the query object of the user query 22. As used herein, the query object refers to an original intent of the user query. For example, if the user query is 'Nike black shoes without laces', the query object is 'shoes' and the query attributes are 'black', 'Nike' and 'without laces'.

Analytics module 16 is configured to generate a weighted entity-affinity relationship graph (EARG) based on the popularity scores and the affinity scores. In one embodiment, a popularity score for each query attribute is computed using session data. The popularity score is a function of the number of times an article related to the product attribute was clicked and searched. In addition, an affinity score is computed between each query attribute and a similar product attribute available on the online fashion platform.

For example, in the user query 'Puma black shoes', the query attribute 'Puma' is similar to another product attribute 'Nike'. It may be noted that the product attribute may refer to all the attributes of all products available on a given online fashion platform. In this embodiment, the affinity score between two product attributes is a function of approximate substitution of one product attribute with another.

Moreover, the analytics module 16 is configured to compute global popularity score across a plurality of product attributes available on the online fashion platform 20 irrespective of product type. In addition, analytics module 16 is configured to compute global affinity score between similar product attributes available on the online fashion platform 20.

Query substitution module 18 is configured to generate a plurality of substitute queries using the EARG and is sorted in order of closeness to the user query. In an embodiment, a plurality of product attributes similar to each of the one or more query attributes are identified using EARG. Further, a priority is assigned to each of the query attributes. In addition, the query substitution module 18 is configured to perform a substitution of query attributes with the product attributes in order of priority assigned and related session data. The query substitution module 16 is further configured to generate a plurality of substitute queries 26. In one embodiment, a highest/optimum substitute query is selected from the plurality of substitute queries 26.

As mentioned above, the weighted entity affinity relationship (EARG) is generated based on the popularity scores and the affinity scores. The manner in which EARG is generated is described in further detail below.

Figure 2:
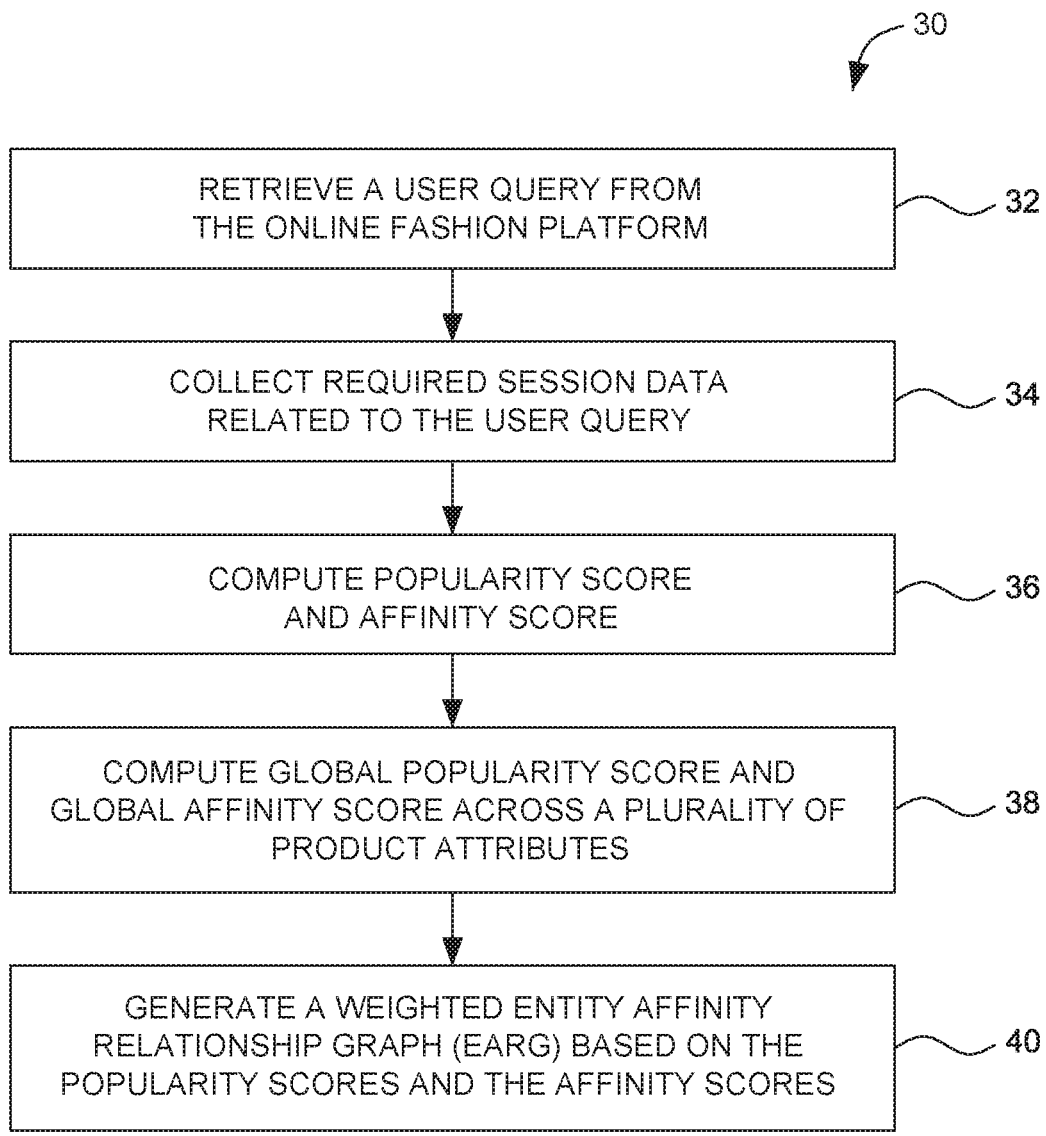
FIG. 2 is a flow diagram illustrating a process for computing popularity scores and affinity scores for generating entity affinity relationship graph, implemented according to the aspects of the present technique.

FIG. 2 is a flow diagram 30 illustrating a process for computing popularity scores and affinity scores for generating entity affinity relationship graph, implemented according to the aspects of the present technique. The EARG is then used to generate a plurality of substitute queries. Each step is described in further detail below.

At step 32, a user query, submitted by a user, is retrieved from the online fashion platform. In one embodiment, the retrieved user query is an annotated query and has one or more free text keywords. Such annotation tags categorize each keyword into types of product and various attributes. For example, for a user query 'Nike black shoes', 'Nike' is annotated in category 'brand' and 'black' in category 'color'.

At step 34, the required session data related to the user query is collected. Multiple products may be explored through clicks and product views within a single session. In an embodiment, a session may have a common context or multiple contexts. In another embodiment, a session is broken down into multiple chunks forming multiple contexts. Each chunk may consist of interrelated products. In this embodiment, the user clicks and views of products with similar product attributes within a session are used to determine the affinity scores and popularity scores.

At step 36, a popularity score for each query attribute is computed. In one embodiment, the popularity score for a query attribute is computed in accordance with the relationship:

$$\text{Popularity}(A_n) = \frac{\sum_{j \in session}\left(\frac{A_{nj}}{\sum_{i \in Attribute} A_{ij}}\right)}{\#session} \quad \text{Equation (1)}$$

Wherein; Popularity($A_n$) is the popularity value of a given query attribute $A_n$ among same class product attributes; (For example, if A can be a 'brand', then n would represent set of all fashion brands;
$A_{nj}$ denotes count of query attribute 'n' of type A in $j^{th}$ session.
session denotes the number of sessions.

Further, an affinity score between each query attribute and a product attribute is computed in accordance with the relationship:

$$Affinity A_m \rightarrow A_n = \mu_{\frac{1}{2}}\left(\frac{A_{n1}}{A_{n1}+A_{m1}}, \frac{A_{n2}}{(A_{n2}+A_{m2})}, \cdots, \frac{A_{ni}}{(A_{ni}+A_{mi})}\right) \quad \text{Equation (2)}$$

wherein Affinity$_{An \rightarrow Am}$ represents the affinity of the query attribute $A_n$ to the product attribute $A_m$;
$\mu_{1/2}$ represents median which can be defined value at the midpoint of a frequency distribution of observed values.

At step 38, a global popularity score of a product attribute is computed across all the product types. Similarly, a global affinity score, that is the affinity between product attributes in a global context is computed.

At step 40, a weighted entity-affinity relationship graph, EARG based on the popularity scores and the affinity scores is generated. As mentioned above, the required session data used to determine the affinity scores and popularity scores is collected. The manner in which the data is collected is described in examples below.

FIGS. 3-A and 3-B are the examples of the session data collected to determine the affinity scores and the popularity scores, implemented according to aspects of present technique. FIG. 3-A, represents a table 50 as an example of 'brand' versus 'session counts' for the 'product type' as 'shoes'. In this example embodiment, the number of products clicked or viewed are determined for each of the one or more sessions as represented by reference numeral 54 associated with each brand. Further, the total number of products clicked for each session across all available brands is determined.

For example, the total number of products clicked across all the sessions for brand 'Nike' is 25 and for brand 'Puma' is 37. In addition, the total number of products clicked for session '$S_1$' across all available brands is 48. Similarly, the total number of products clicked for session '$S_2$', across all available brands is 10 and so on.

In an embodiment, the data collected in the table 50 is used to compute the popularity of brand. For example, the popularity of brand 'Nike' for product type 'shoes' is computed in accordance with the relationship:

Popularity(brand$_{Nike}$)=sum of popularity of Nike across all sessions/number of sessions   Equation (3)

FIG. 3-B illustrates an example table 70 with affinity scores based on the different brands available on the online fashion platform. In an embodiment, the affinity of the query attribute $A_n$ to the product attribute $A_m$ in a particular session is represented by Affinity$_{An \rightarrow Am}$ and is defined as $A_n/(A_n+A_m)$   Equation (4)

For example, table 70 enlists the affinity scores of various brands to 'Nike'. In an example, the affinity score of 'Puma' to 'Nike' for session $S_1$ is computed as:

Affinity$_{brand\ Puma \rightarrow brand\ Nike\ for\ session\ S_1}$=20/(20+10)

Similarly, the affinity score of Puma to Nike for session $S_2$ is computed as:

Affinity$_{brand\ Puma \rightarrow brand\ Nike\ for\ session\ S_2}$=3/3+2)

In a further embodiment, the affinity score of Puma to Nike across all the sessions is computed in accordance with the relationship given in Equation 2. In this given embodiment, it is calculated as $$Affinity_{Brand\ Puma \rightarrow Brand\ Nike} =$$
$$median\left(\frac{20}{20+10}, \frac{3}{3+2}, \frac{8}{8+0}, \frac{2}{2+8}, \frac{4}{4+5}\right) =$$
$$median(0.66, 0.6, 1, 0.2, 0.44) = 0.6$$

As mentioned above, query substitution module uses a query substitution algorithm to generate a plurality of substitute queries using EARG. The manner in which the substitution algorithm works is described in further detail below.

Figure 4:
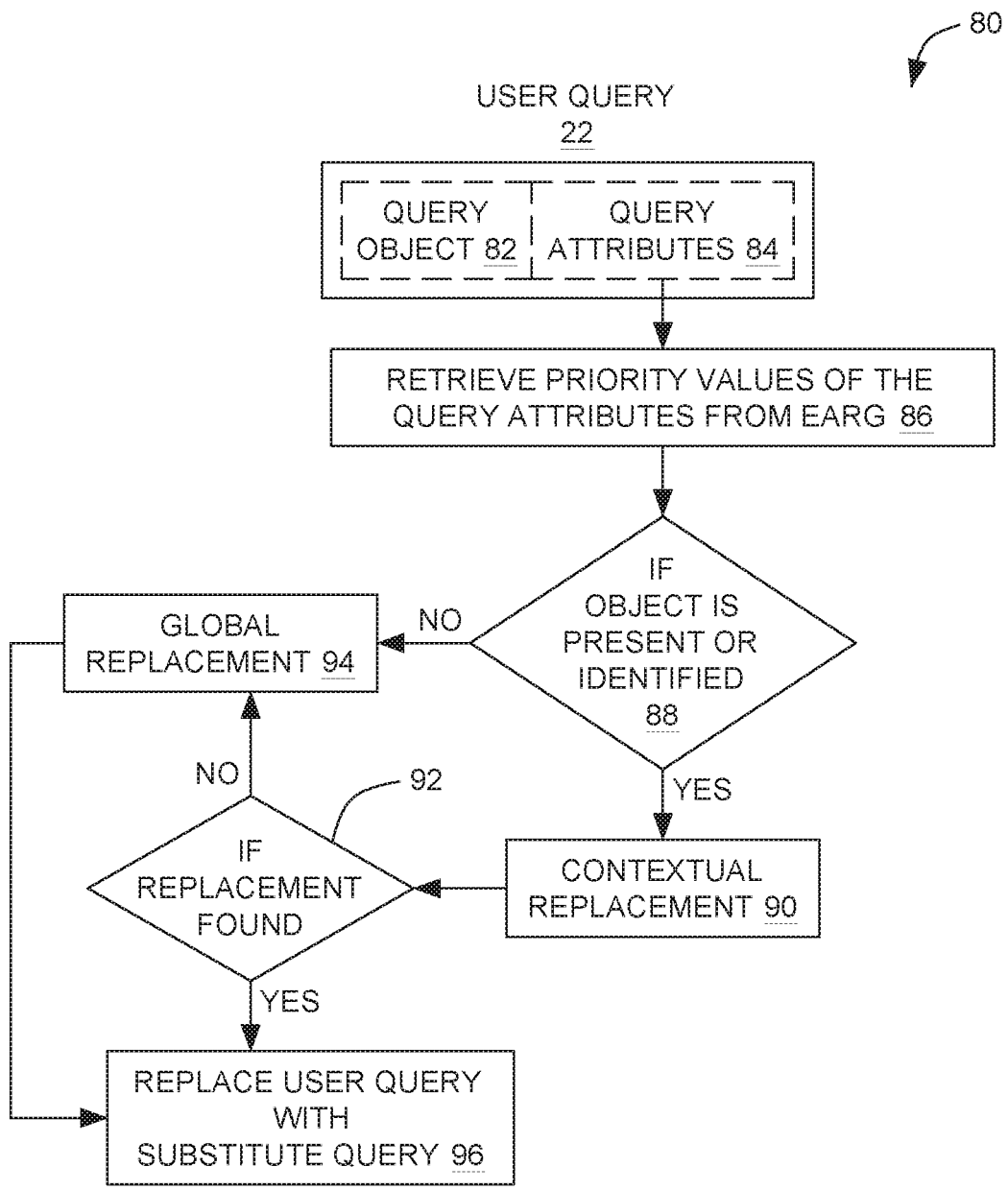
FIG. 4 is a flow chart illustrating the steps involved in generating the plurality of substitute queries, implemented according to aspects of the present technique.

FIG. 4 is a flow chart 80 illustrating the steps involved in generating the plurality of substitute queries, implemented according to aspects of the present technique. In this embodiment, the query object 82 of the user query 22 is excluded from the substitution process while the substitution algorithm is performed on one or more query attributes 84 associated with the query object 82 of the user query 22.

At block 86, a priority assigned to each query attributes are retrieved from EARG. In one embodiment, the query attributes 84 are prioritized contextually or globally.

At block 88, if the query object is present in the user query 22 then contextual replacement of the query attributes (block 90) is performed. In this embodiment, the query object and the query attributes have an association. For example, if Nike sells 'slip-on shoes' (shoes without laces) but is out of stock, then in this particular instance, the substitution of user attribute 'Nike' is performed in context of the query object 'shoes'. However, if the query object is not present or not identified in the user query, then global replacement of the query attributes is performed (block 94).

At block 92, if no replacements are found after performing contextual replacement, then global replacement (block 94) is performed. In this embodiment, there is no direct association of query attributes with the identified query object. For example, if the user query is 'Reebok dress' and the intent is to buy a sporty dress, and if Reebok does not make dresses, then in this particular instance another sports brand which offers dresses is identified.

However, if the replacement is found at block 92, then a plurality of substitute queries is generated (block 96). In one embodiment, the substituted queries are sorted in order of closeness to the original query. Further, an optimum substitute query is selected from the plurality of substitute queries.

It may be noted that in some cases, query expansion techniques such as pseudo-relevance feedback, query relaxation or deleting query terms may be applied. The user query may be expanded when the query attributes have zero relevance and do not derive any hidden intent or query object.

As mentioned earlier, a weighted entity-affinity relationship graph is generated using session data, popularity scores and affinity scores. The manner in which the relationship graph is represented is illustrated in FIG. 5 below.

Figure 5:
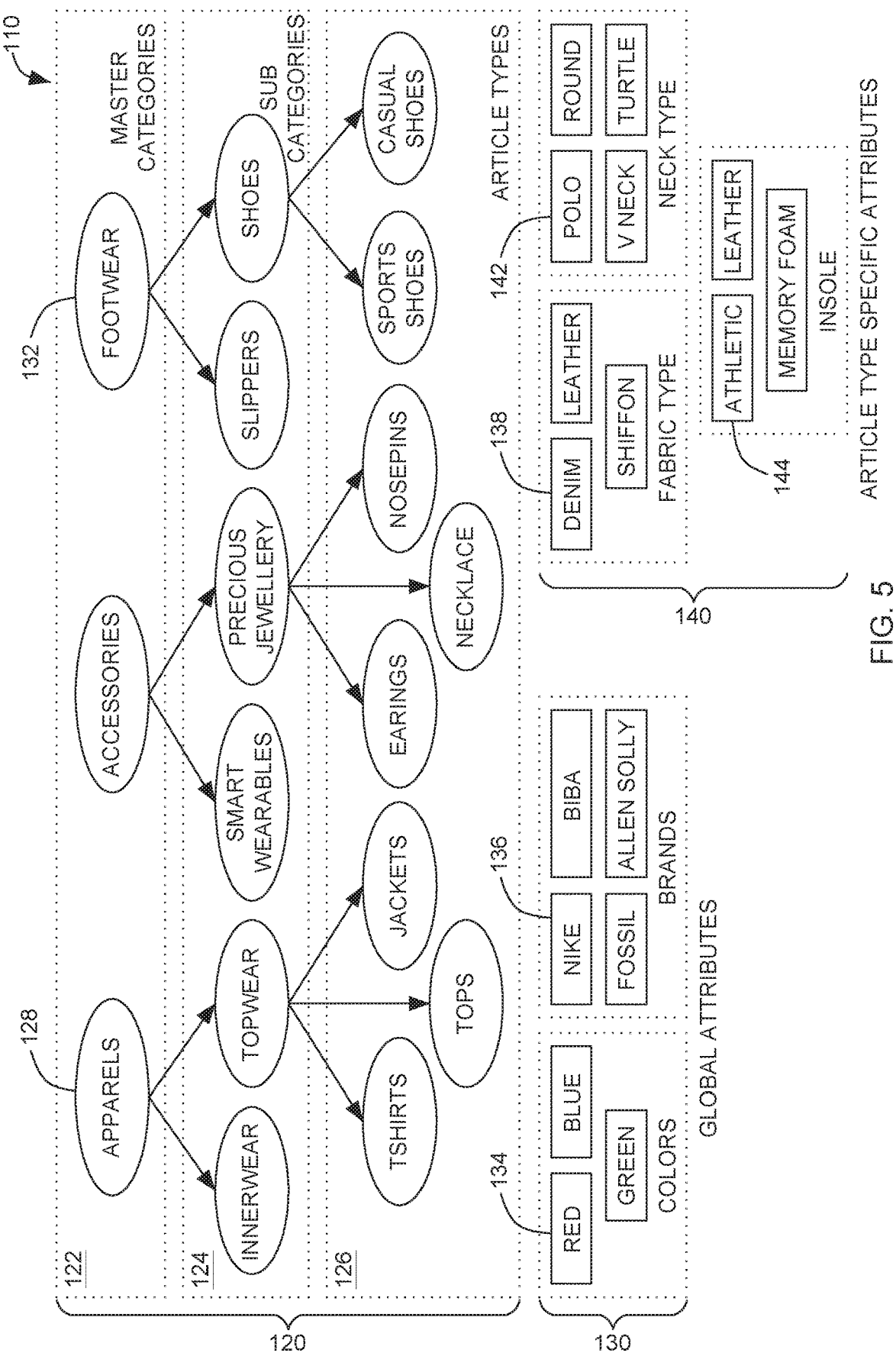
FIG. 5 is a graphical representation of an embodiment of a generated entity affinity relationship graph, implemented according to the aspects of the present technique.

FIG. 5 is a graphical representation 110 of an embodiment of a generated EARG, implemented according to the aspects of the present technique. In an embodiment, the generated EARG includes a plurality of nodes and a plurality of edges to represent an inter-relation of products and their attributes. In this embodiment, nodes are broadly classified into product category/type 120, global attributes 130 and article type specific attributes 140. Product category/type 120 may further be classified as master categories 122, sub categories 124 and article type 126.

In an embodiment each node represents a product attribute. For example, product attributes in master category may be 'Apparels' 128, 'Footwear' 132 and the like. Similarly, nodes present in the global attribute category may include colors and brands. For example, nodes such as 'Red' 134, 'Nike' 136 and the like represent global attributes available on the online fashion platform. Article type specific attributes may include nodes such as 'denim' 138 in the fabric category, 'Polo' 142 in the neck type category. In one embodiment, each node is assigned with a popularity score to determine priority of the query attributes. The generated EARG can be further explained using sub-graphs described in further detail below.

FIGS. 6-A and 6-B are graphical representation of example embodiments of the generated EARG, implemented according to the aspects of the present technique. In an embodiment, a plurality of edges represents the inter-relation among the nodes in the EARG. The edges are broadly classified into article type specific popularity, global affinity of attributes and article type specific affinity of attributes. In an embodiment, the article type specific popularity are the weighted edges from global attributes and article type specific attributes to product category nodes such as master category, sub category and article type. In this embodiment, weights represent the popularity of global or article type specific attributes given the product category context to which the edge is connected. In addition, the score on each node represent the popularity of that product attribute in the context of that category.

For example, as illustrated in FIG. 6-A, a solid arrow represents article type specific popularity. The score on node 162 represents the popularity of 'Nike' of about 0.02709 in the context of category 'brand'. Further, in this example the popularity of 'Nike' 162 as a 'brand' when article type is 'casual shoes' 164 is computed as about 0.0657. In another embodiment, the dashed arrows represent affinity between two product attributes of same type such as brand to brand affinity. In addition, the weights on the edges represents the affinity score. 'Nike' has the maximum affinity to 'adidas' with an affinity score of about 0.0362 and least affinity to HRX with an affinity score of about 0.0088. Similarly, HRX has maximum affinity to 'Roadster' with an affinity score of about 0.0235 and least affinity to 'Mast & Harbour' with affinity score of about 0.0079.

In another embodiment, the global affinity of product attributes are weighted edges between two nodes of the same type. For example, 'Nike' is connected to 'Reebok' as both are sports brands. In this embodiment, weights represent the strength of the affinity between product attributes.

Similarly, the article type specific affinity of attributes are weighted edges representing affinity between the nodes, given any context. For example, as illustrated in FIG. 6-B, the dashed arrow represents top 5 article specific affinity scores for brand 'Nike'. For example, for article type 'casual shoes', 'Nike' has maximum affinity to 'Puma' and minimum affinity to 'UCB' where as when the article type is 'sports shoes', 'adidas' is the most similar brand and 'ASICS' is least similar.

Figure 7:
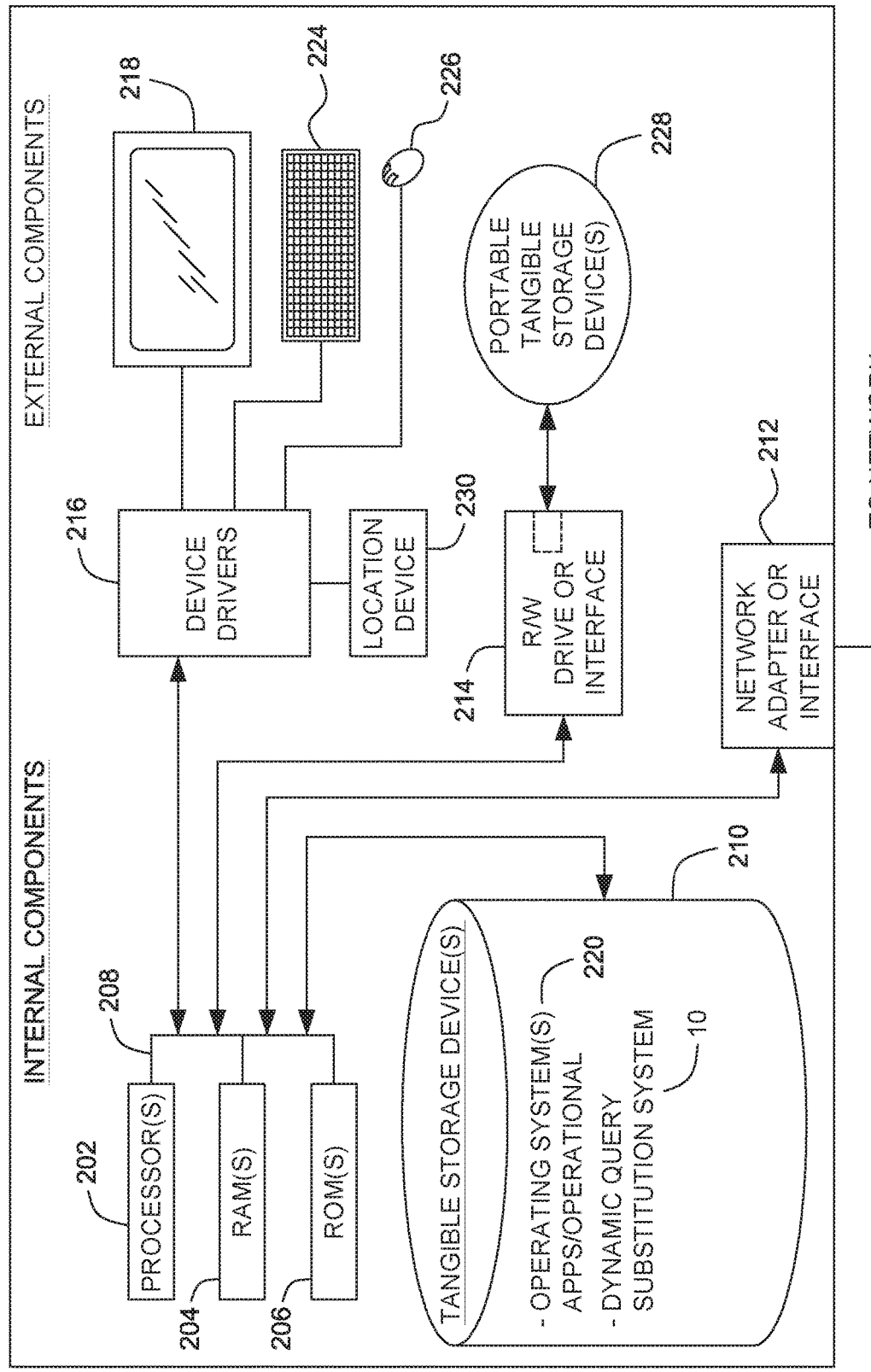
FIG. 7 is a block diagram of an embodiment of a computing device in which the modules of the dynamic query substitution system, described herein, are implemented.

The modules of the dynamic query substitution system 10 described herein are implemented in computing devices. One example of a computing device 200 is described below in FIG. 7. The computing device includes one or more processor 202, one or more computer-readable RAMs 204 and one or more computer-readable ROMs 206 on one or more buses 208. Further, computing device 200 includes a tangible storage device 210 that may be used to execute operating systems 220 and the dynamic query substitution system 10. The various modules of the dynamic query substitution system 10 includes a query retrieval module 12, a session data module 14, an analytics module 16 and a query substitution module 18 and may be stored in tangible storage device 210. Both, the operating system 220 and the system 10 are executed by processor 202 via one or more respective RAMs 204 (which typically include cache memory). The execution of the operating system 220 and/or the system 10 by the processor 202, configures the processor 202 as a special purpose processor configured to carry out the functionalities of the operation system 220 and/or the dynamic query substitution system 10, as described above.

Examples of storage devices 210 include semiconductor storage devices such as ROM 206, EPROM, flash memory or any other computer-readable tangible storage device that may store a computer program and digital information.

Computing device also includes a R/W drive or interface 214 to read from and write to one or more portable computer-readable tangible storage devices 228 such as a CD-ROM, DVD, memory stick or semiconductor storage device. Further, network adapters or interfaces 212 such as a TCP/IP adapter cards, wireless Wi-Fi interface cards, or 3G or 4G wireless interface cards or other wired or wireless communication links are also included in computing device.

In one example embodiment, the dynamic query substitution system 10 which includes a query retrieval module 12, a session data module 14, an analytics module 16 and a query substitution module 18 may be stored in tangible storage device 210 and may be downloaded from an external computer via a network (for example, the Internet, a local area network or other, wide area network) and network adapter or interface 212.

Computing device further includes device drivers 216 to interface with input and output devices. The input and output devices may include a computer display monitor 218, a keyboard 224, a keypad, a touch screen, a computer mouse 226, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A system for dynamic substitution of a user query adapted for use in an online fashion platform, the system comprising:

a memory having computer readable instructions stored thereon; and at least one processor configured to execute the computer readable instructions to, retrieve the user query from the online fashion platform, the user query being provided by a user of the online fashion platform, and the user query including one or more query attributes;

store session data received from the online fashion platform, the session data collected over a plurality of sessions from at least one user on the online fashion platform;

analyze the user query to identify and extract a query object and one or more query attributes;

compute a popularity score for each query attribute, the popularity score being a function of the number of times an article related to the respective query attribute was clicked and searched;

compute an affinity score between each query attribute and related product attributes, the affinity score between two related product attributes being a function of approximate substitution of one product attribute with another;

generate a weighted entity-affinity relationship graph (EARG) based on the popularity scores and the affinity scores; and generate a plurality of substitute queries sorted in order of closeness to the user query using the generated EARG, wherein the generated EARG comprises a plurality of nodes and a plurality of edges to represent an inter-relation of products and their attributes, and a plurality of edges represents the inter-relationship among the nodes in the generated EARG, and the edges are broadly classified into article type specific popularity, global affinity of attributes and article type specific affinity of attributes.

2. The system of claim 1, wherein the session data comprises historical data collected over a plurality of sessions.

3. The system of claim 1, wherein one or more query attributes identified from the user query are associated with the query object of the user query.

4. The system of claim 1, wherein the at least one processor is further configured to compute global popularity score of an attribute across a plurality of product attributes available on the online fashion platform.

5. The system of claim 1, wherein the at least one processor is further configured to compute global affinity score across a plurality of product attributes available on the online fashion platform.

6. The system of claim 1, wherein the at least one processor is further configured to identify a plurality of product attributes similar to each of the one or more query attributes using the EARG.

7. The system of claim 1, wherein the at least one processor is further configured to assign a priority to each of the query attributes identified using the EARG.

8. The system of claim 1, wherein the at least one processor is further configured to perform substitution of query attributes in order of priority to generate a plurality of substitute queries.

9. The system of claim 1, wherein the at least one processor is further configured to select an optimum substitute query from the plurality of substitute queries.

10. The system of claim 9, wherein the optimum substitute query comprises of product attributes available or not available on the online fashion platform.

11. The system of claim 1, wherein the nodes are broadly classified into product category/type, global attributes and article type specific attributes.

12. The system of claim 1, wherein each node is assigned with a popularity score to determine priority of the query attributes.

* * * * *